United States Patent [19]

Wareham

[11] Patent Number: 5,592,733
[45] Date of Patent: Jan. 14, 1997

[54] HIGH PRODUCTION HARDWARE INSERTION PRESS INCORPORATING OPERATOR AND TOOL PROTECTION SYSTEMS AND APPARATUS

[75] Inventor: Robert C. Wareham, Midland, Mich.

[73] Assignee: Haeger, Inc., Oakdale, Calif.

[21] Appl. No.: 340,748

[22] Filed: Nov. 16, 1994

[51] Int. Cl.$^6$ ............................ B21J 15/28; B23Q 11/00
[52] U.S. Cl. ................................. 29/708; 72/21.3; 83/58; 83/DIG. 1; 100/53; 192/132; 192/134
[58] Field of Search .......................... 29/708, 709, 712, 29/714, 715, 716; 192/132, 134; 72/21.3, 20.1; 83/DIG. 1, 58; 100/53

[56] References Cited

U.S. PATENT DOCUMENTS

| | | | |
|---|---|---|---|
| 4,280,610 | 7/1981 | Meacham | 192/132 |
| 4,391,358 | 7/1983 | Haeger | 29/708 X |
| 4,570,839 | 2/1986 | Cox et al. | 100/53 X |
| 4,586,248 | 5/1986 | Ho | 29/708 |
| 4,631,383 | 12/1986 | Haggett | 192/134 X |
| 4,694,671 | 9/1987 | Downham | 29/708 X |
| 4,698,905 | 10/1987 | Taga | 29/708 X |
| 5,086,965 | 2/1992 | Marsteller et al. | 72/21.3 X |

Primary Examiner—Joseph M. Gorski
Attorney, Agent, or Firm—Mark D. Miller

[57] ABSTRACT

Presented is a hardware insertion press of the type for insertion of fasteners in sheet metal. The press incorporates both operator and tool protection systems that prevent the operator from being injured during use of the press, and which prevent the tool from being damaged by misalignment of a fastener in relation to the workpiece to which the fastener is intended to be fastened. For operator safety, the press is equipped so that the ram will retract if the tool encounters a part of the operator's body, such as a hand or finger. For tool protection the press incorporates mechanisms that define the press "window" so that a misaligned fastener encountered out of the range of the press window will cause the ram to be interrupted in its movement. The press also incorporates a lower tool mounting structure that accommodates vibration of the press, and which may be adjusted to quickly and easily align or intentionally misalign the upper and lower tooling, and for enabling removal and precise positional replacement of the lower tooling in its original position.

14 Claims, 13 Drawing Sheets

HIGH PRODUCTION HARDWARE INSERTION PRESS INCORPORATING OPERATOR AND TOOL PROTECTION SYSTEMS AND APPARATUS

BACKGROUND OF THE INVENTION

1. Field of the Invention

The invention relates to automatic hardware presses of the type utilized to press fasteners into sheet metal, and relates particularly to an automatic hardware press that incorporates safety features for the protection of the operator and the tooling used with such presses.

2. Description of the Prior Art

The below-listed U.S. Pat. Nos. are known to exist:

| | | |
|---|---|---|
| 1,648,296 | 2,387,478 | 2,400,486 |
| 2,438,837 | 2,767,819 | 2,858,930 |
| 3,240,310 | 3,258,106 | 3,275,120 |
| 3,288,267 | 3,315,049 | 3,487,182 |
| 3,803,898 | 3,521,735 | 3,578,142 |
| 3,866,004 | 3,907,099 | 3,938,245 |
| 3,939,314 | 4,060,160 | 4,075,961 |
| 4,236,302 | 4,348,806 | 4,391,358 |
| 4,395,641 | 4,676,421 | 4,699,261 |
| 4,739,873 | 5,086,965 | 5,191,960 |

Other patents known to exist include Japanese Patent 0262718 issued December, 1985, and Japanese Patent 0124417 issued June, 1986.

It is noted that U.S. Pat. No. 4,391,358 and 5,191,960, listed above, are owned by the assignee of the instant invention.

U.S. Pat. No. 4,391,358, owned by the assignee hereof, addresses the problem of operator safety, and provides a means for retracting the press ram if the operator's finger or any other part of the operator's body intervenes between the ram and the workpiece. Operatively, circuit means are provided to sense when electrical contact occurs between the upper and lower tooling. It is one of the objects of the present invention to provide an operator and tool protection system that expands and improves on the method and apparatus disclosed in this previous patent.

The installation of hardware into sheetmetal assemblies has, in the past, been a process that can result in damaged tooling when a fastener, for instance, fails to completely enter an automatic tool. Accordingly, it is another object of the present invention to provide a method and apparatus that senses the improper positioning of the fastener and deactivates the press to thereby prevent damage to the tooling.

Another disadvantage of some hardware insertion presses is that they sometimes shear off a portion of a mispositioned fastener intended to be inserted into the sheetmetal workpiece, and then press the sheared off portion of the fastener into the workpiece in the area where the complete fastener was intended to be inserted. It is therefore another object of the present invention to provide an automatic hardware insertion press that senses misplacement of the fastener, inhibits shearing of the fastener, and inhibits the imposition of pressure on a misplaced or sheared fastener, thus preventing damage to the workpiece, which would otherwise have to be reworked or scrapped, with attendant expense.

Automatic insertion presses operate on a cyclical basis in which the ram to which the upper tooling is attached reciprocates between a retracted upper position and a lower "press" position to place the upper tooling in cooperative association with the lower tooling to "insert" or press the fastener into an appropriate aperture in the workpiece by the application of pressure on the fastener. In the press described in U.S. Pat. No. 4,391,358, an electrical circuit, including a switch associated with the upper tooling, normally senses and responds to electrical contact between the upper and lower tooling. As a consequence thereof the ram is permitted to impose insertion pressure on the fastener. It should be noted that the spacial position of the upper tooling in relation to the lower tooling in this prior patent is not critical to the imposition of insertion pressure. Thus, insertion pressure may be applied at any point along the excursion path of the ram if electrical continuity between the upper and lower tooling is sensed.

If the circuit does not sense electrical continuity between the upper and lower tooling, as when an electrically non-conductive impediment, such as a finger or hand, is interposed between the upper and lower tooling, the imposition of a non-injurious light pressure on the upper tooling by non-electrical contact with the impediment actuates the switch associated with the upper tooling and the circuit that controls imposition of insertion pressure by the ram is interrupted and the ram returns to its retracted position without imposing insertion pressure on the impediment. It is therefore a still further object of the present invention to provide means for adjustably defining a predetermined press "window" constituting an adjustable spacial relationship between the upper and lower tooling only within which the ram may be driven by insertion pressure, but which even within the press "window" the ram may still be retracted if the upper tooling encounters a non-electrically conductive impediment.

A still further object of the invention is the provision of a press which exerts insertion pressure only within a predetermined press "window", and which provides for the retraction of the ram if the pressure on the tooling builds up to a predetermined level either before or after the specified range defined by the press "window" within which the fastener is intended to be installed.

For universal application of the automatic press of the instant invention to press "hardware" regardless of the material from which the hardware is fabricated, i.e., electrically conductive or electrically non-conductive, means are provided for selectively actuating to "open" condition the pressure sensitive switch associated with the ram so as to override the safety feature that causes the ram to retract when the upper tooling encounters an electrically non-conductive impediment, while still retaining the adjustable means by which the press "window" is defined.

Yet another object of the invention is the provision of an automatic hardware insertion press wherein the means for defining the press "window" may be selectively deactivated.

One of the problems often encountered in automatic hardware insertion presses, which are inherently subjected to vibration during use, is proper alignment (or intentional misalignment) of the upper tooling mounted on the ram in relation to the lower tooling on which the workpiece is supported. Accordingly, a still further object of the present invention is the provision of a press incorporating means for securing the lower tooling in a manner that facilitates alignment of the upper and lower tooling, or intentional misalignment thereof when required by special circumstances.

During use, the tooling of a press must occasionally be removed and replaced with different tooling to accommodate different types of fasteners or workpieces. With conventional presses, it is sometimes very difficult to mount the original tooling in precisely the original position to thus enable accommodation of a previous workpiece. It is therefore yet another object of the invention to provide a mounting means for the lower tooling that is adjustable in relation to the axis of travel of the upper tooling whereby precise repeated placement of the lower tooling may be accomplished quickly and accurately.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the automatic hardware insertion press of the invention incorporates operator protection means cooperatively associated with the ram and the tooling mounted thereon which, when caused to be activated by the application of non-injurious pressure on an abnormal impediment, causes the ram to stop or retract without imposing injurious pressure. In conjunction with such operator protection means, there is cooperatively related additional operator and tool protection means that is selectively adjustable to define a press "window" having predetermined upper and lower limits, and which precludes imposition of sufficient insertion pressure to injure the tooling if the fastener intended to be installed is misplaced in relation to the limits imposed by the press "window". Means are also provided for mounting the lower tooling in a manner to accommodate vibration of the press, to quickly and easily align or intentionally misalign the upper and lower tooling, and for enabling removal and precise replacement of the lower tooling in its original position.

DESCRIPTION OF THE PREFERRED EMBODIMENT

In terms of greater detail, the high production hardware insertion press incorporating operator and tool protection systems and apparatus forming the subject matter of the invention described, illustrated and claimed herein, comprises a press assembly that takes into consideration two very important aspects of press operation, namely, protection of the operator to prevent maiming, and protection of the tooling to protect against destruction of the tooling and/or destruction of the workpiece in conjunction with which the press is being used.

In a first aspect, it is important that a press have the capability of being "set" to back off without exerting injurious pressure in the event an operator's finger or hand intervenes between the upper and lower tooling during an operation.

In a second aspect, and related to the first, it is also important that the opportunity for the operator's finger or hand to be intervened between the upper and lower tooling be minimized. To preclude such intervention by the operator's finger or hand, the press of the present invention incorporates a control system that precisely defines the limits of a "press" window within which injurious pressures may be applied, thus limiting the opportunity for the operator's fingers or hand to intervene between the tooling.

Thirdly, and interrelated with the first and second aspects defined above, it is particularly advantageous that the press incorporate apparatus that enables the tooling of the press to be protected against damage, and that the workpiece also be protected against damage.

Figure 1:
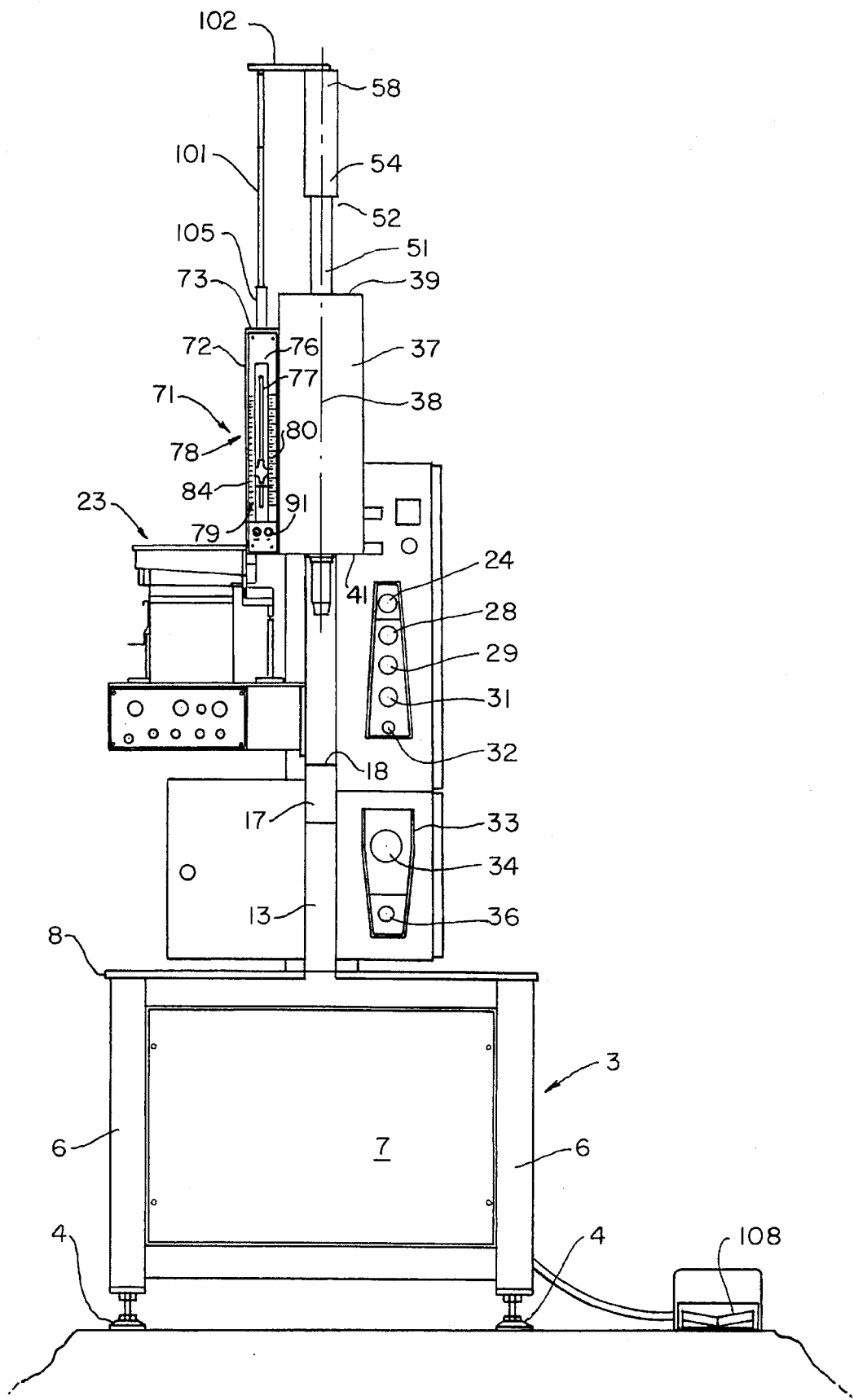
FIG. 1 is a front elevational view of the high production hardware insertion press of the invention.
Figure 2:
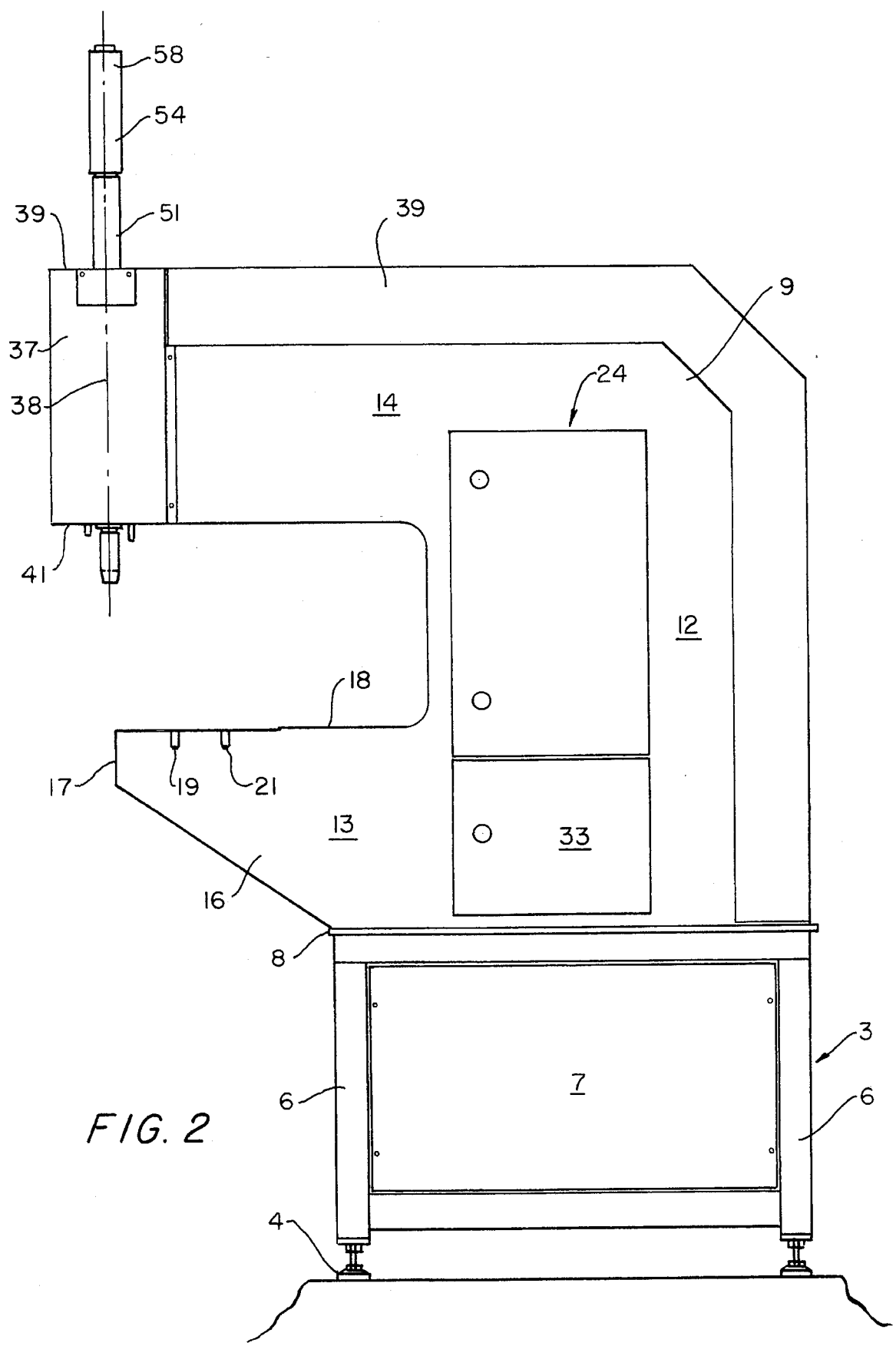
FIG. 2 is a right side elevational view thereof shown with the lower tool holder removed for purposes of clarity.
Figure 3:
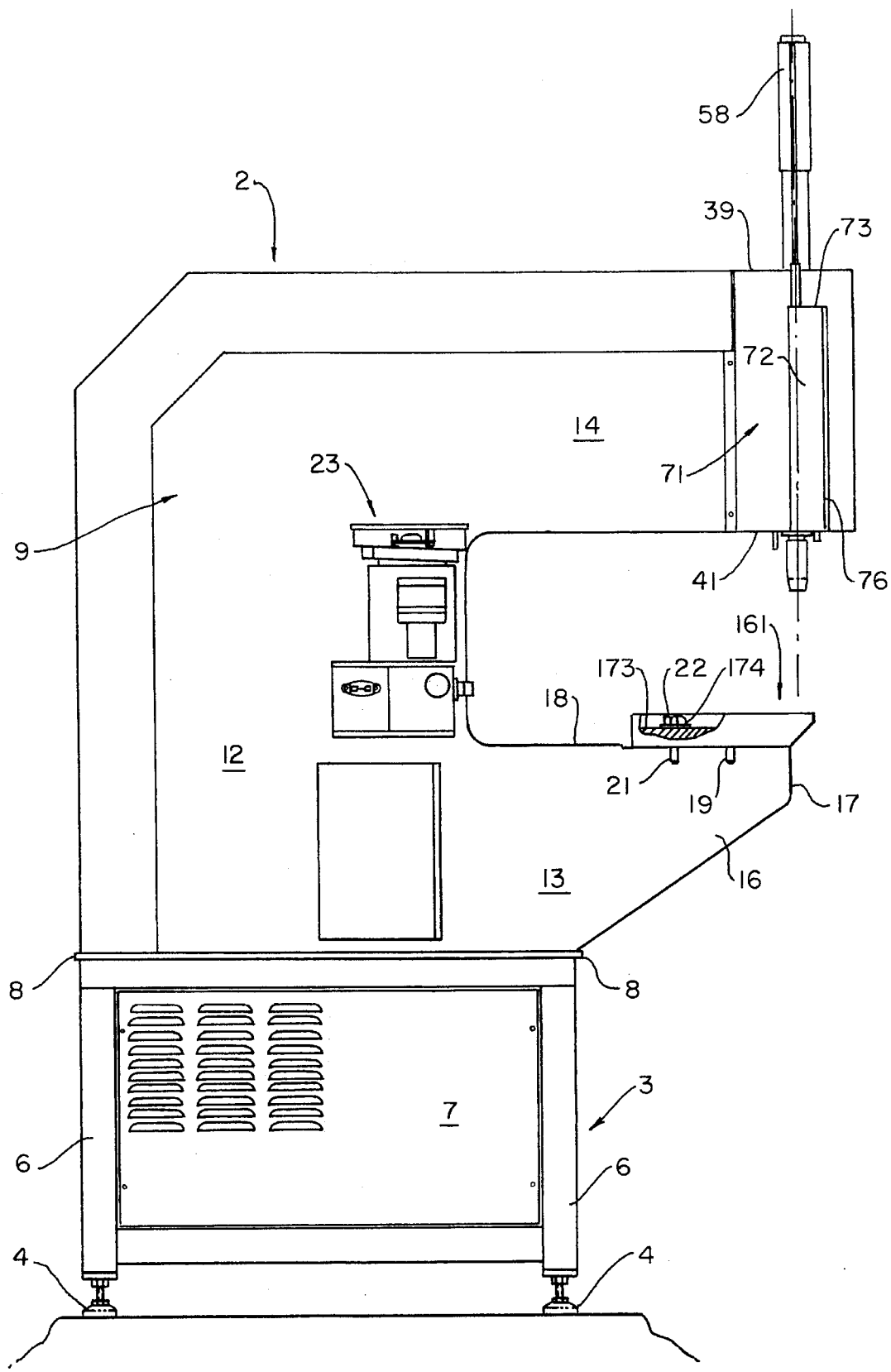
FIG. 3 is a left side elevational view thereof shown with the lower tool holder in place and a portion thereof broken away to show the underlying structure.
Figure 4:
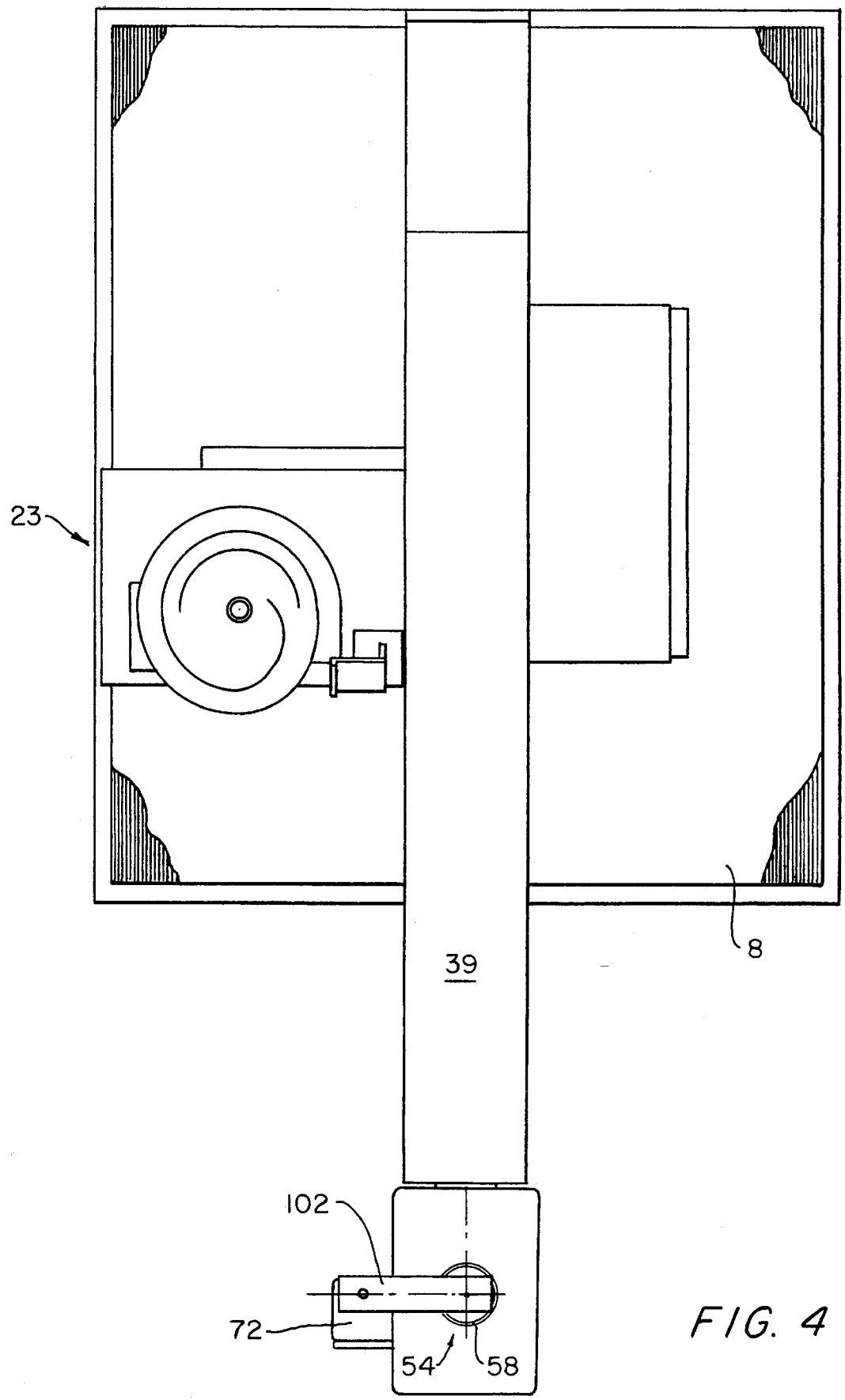
FIG. 4 is a top plan view thereof.
Figure 5:
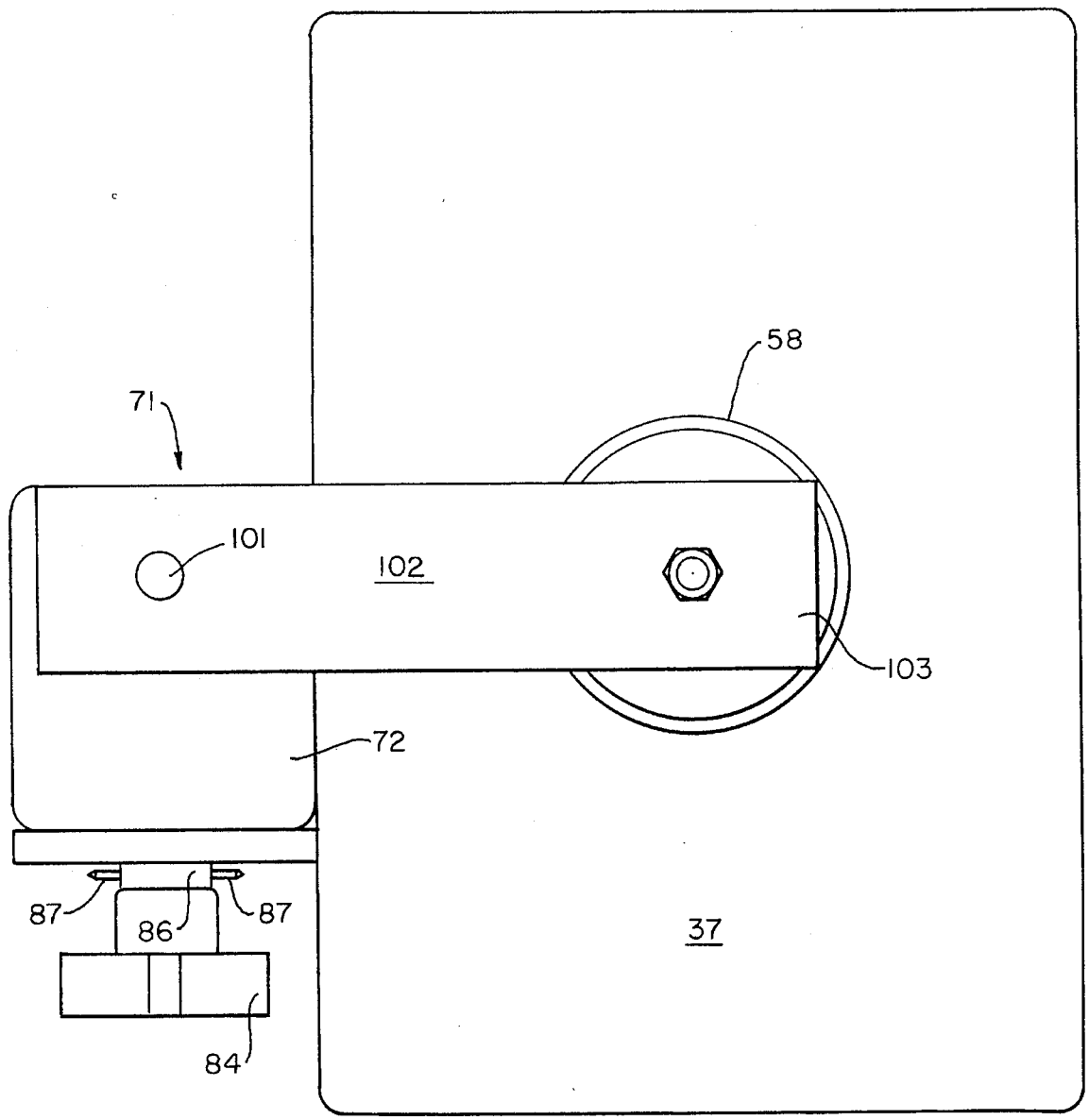
FIG. 5 is a top plan view of the support housing for the hydraulic ram and the attached tool protection system shown apart from the remainder of the press structure.
Figure 6:
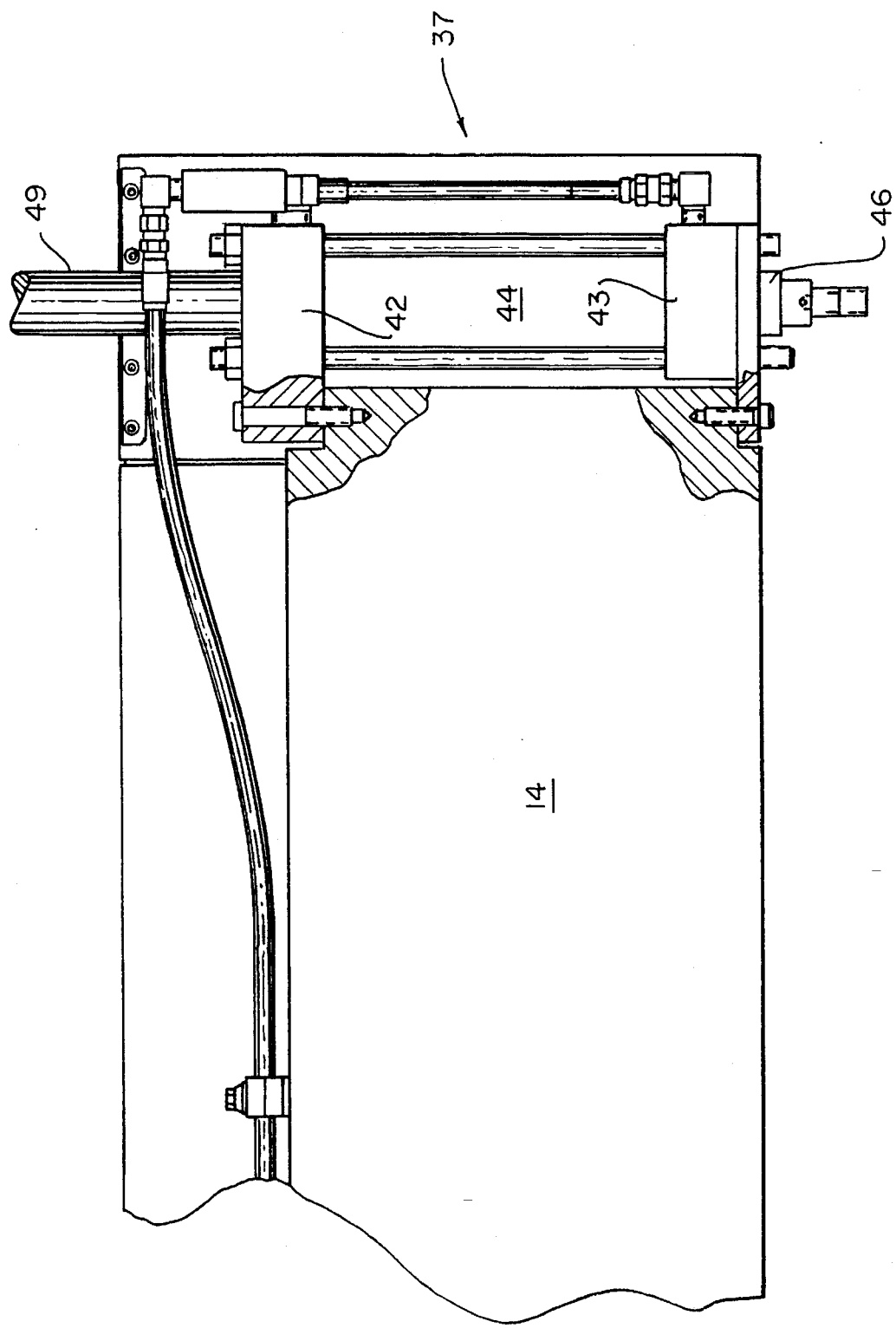
FIG. 6 is a fragmentary vertical sectional view of the support housing of FIG. 5 illustrating the manner of mounting the hydraulic cylinder on the upper arm of the press frame.

The press of the present invention, as illustrated in the drawings and described herein, and designated generally by the numeral 2, accomplishes these worthwhile purposes by methods and through use of apparatus not heretofore available. Referring to FIGS. 1–3, it will be noted that the press is provided with a base unit designated generally by the numeral 3, within which the hydraulic fluid reservoir (not shown) is enclosed, and within which much of the hydraulic system controls (not shown) are also enclosed. With respect to the hydraulic system, this may be essentially similar to the hydraulic system illustrated and described in U.S. Pat. No. 4,391,358, which system, in the interest of brevity in this description, is included herein by reference.

The base unit 3 is provided with adjustable leveling "feet" 4 mounted at the bottom end of the four corner posts 6, and detachable metal panels 7 are mounted on the corner posts to enclose the base unit as shown. On its top side, the base unit is provided with a heavy steel mounting plate 8 appropriately welded to the upper end of the base unit to provide the strength and rigidity required to support a monolithic horizontal U-shaped main frame designated generally by the numeral 9, and including a vertically extending main body member 12 integral at its lower end with a horizontally extending lower tool-support anvil member 13, and integral at its upper end with a horizontally extending hydraulic ram/upper tool assembly support member 14.

Referring to FIG. 1, it will be seen that the lower anvil member 13 and the upper ram/tool assembly support member 14 lie in a common vertical plane disposed medianly across the heavy steel mounting plate 8. The lower anvil member is welded or otherwise securely fastened to the mounting plate, and a portion 16 of the lower anvil member projects cantilever-like beyond the front edge of the base unit to provide a front end surface 17 and a lower tool-support surface 18 provided with a pair of bores 19 and 21. The bore 19 is a smooth bore for reasons that will hereinafter be explained, while the bore 21 is threaded to receive a threaded cap screw 22 for reasons which will also be explained hereinafter.

Referring to FIGS. 1, 2 and 3, it will be seen that the generally U-shaped main frame is utilized to support on its left side as seen in FIGS. 1 and 3, a modular automatic feed system designated generally by numeral 23. This modular automatic feed system functions in cooperation with the press to deliver fasteners to the tooling for insertion into appropriate bores in a workpiece. The structure and operation of the modular automatic feed system is described in detail in U.S. Pat. No. 5,191,960 owned by the owner of the instant invention, and in the interest of brevity, the description of the feed system contained in U.S. Pat. No. 5,191,960 is included herein by reference.

Figure 16A:
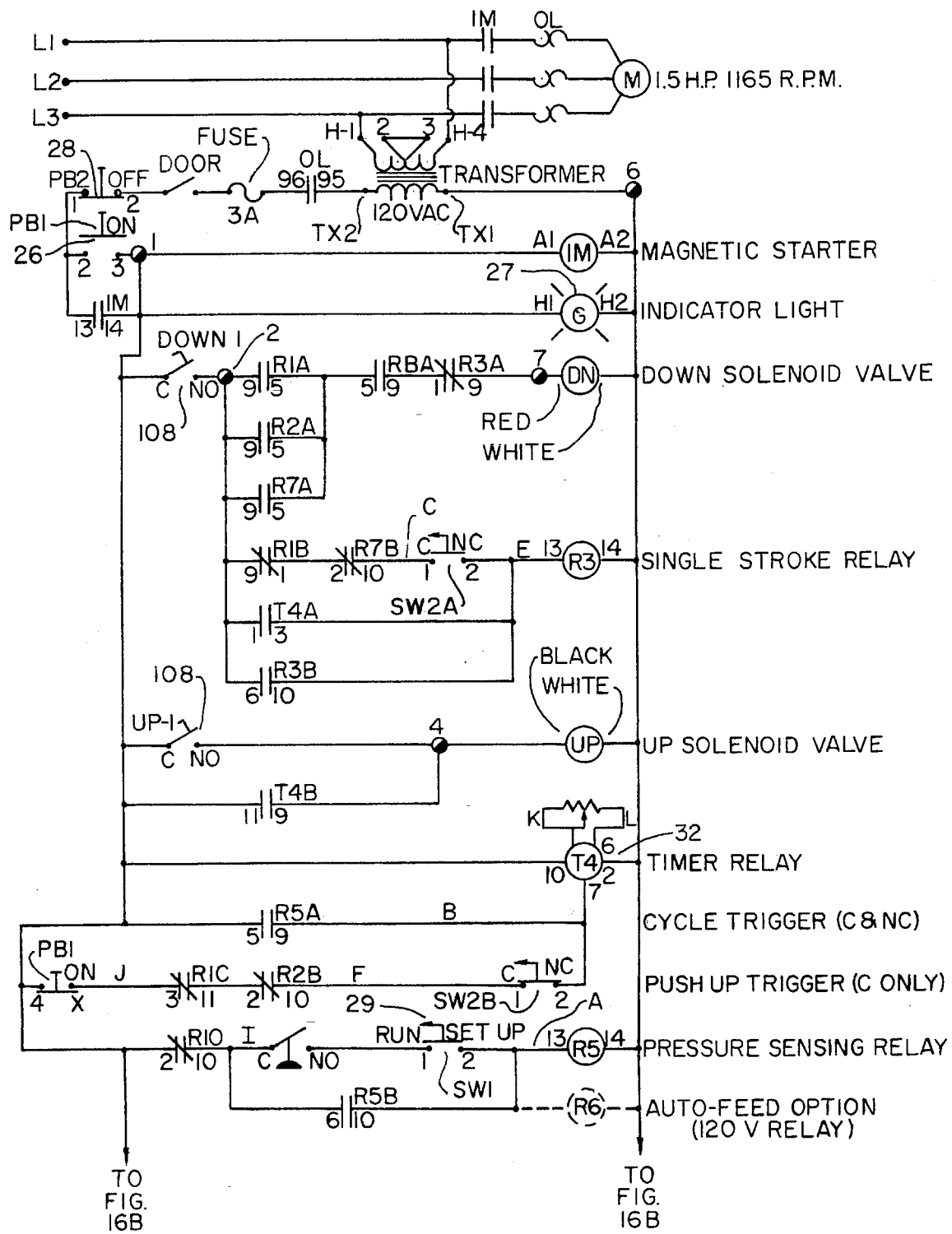
FIG. 16(A) and 16(B) illustrate a schematic of the electrical system for operation of both the tool protection system and the operator safety system.
Figure 16B:
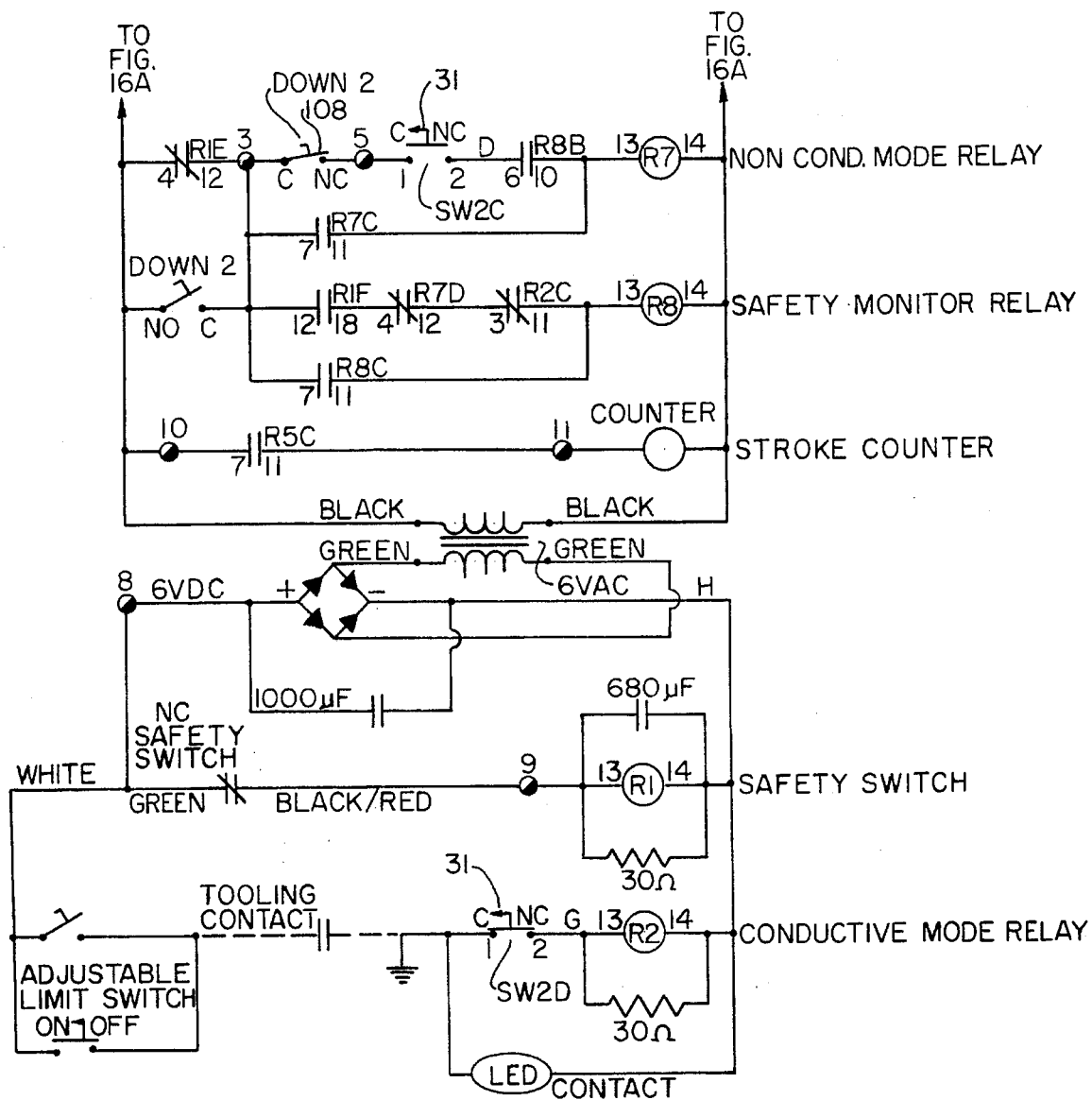

On the opposite side, i.e., the right side of the U-shaped main frame, there is mounted a control box designated generally by the numeral 24, and within which is contained the electrical circuit elements illustrated schematically in FIG. 16. Referring to FIGS. 1 and 16, the electrical circuit includes an ON switch 26 of the push-button type that incorporates a light source 27 that illuminates when the switch is in the ON condition to indicate to the operator that the press is electrically energized. Below the ON button there is located an OFF button 28 for deenergizing the press. On the front surface of the electrical control box 24 is a set-up/run selector switch 29, and a conductive/non-conductive mode selector switch 31 which when set in non-conductive mode, as when it is desired to use the press on workpieces that are electrically non-conductive, such as plastic or anodized aluminum, neutralizes the operator safety system, while when set in conductive mode for use in conjunction with conductive workpieces, re-establishes the operator safety system. Below the mode selector switch 31 on the face of the panel, there is provided a digitally adjustable rheostat timer device 32 that selects and controls the velocity of retraction of the press ram. Stated another way, the rheostat timer facilitates control over the reciprocation rate of the press ram. Referring to FIG. 1, it will be seen that below the electrical control box 24, there is another compartment designated generally by the numeral 33. Within this compartment are housed a pressure gauge connected into the hydraulic system of the press, which is essentially as described in U.S. Pat. No. 4,391,358, the visible dial 34 indicating the amount of hydraulic pressure exerted by the ram. Calibration of the pressure gauge to indicate active pressure is accomplished by selective actuation of the control knob 36 that connects within the compartment with a tee-connection to selectively connect the pressure gauge with the source of hydraulic pressure.

Figure 8:
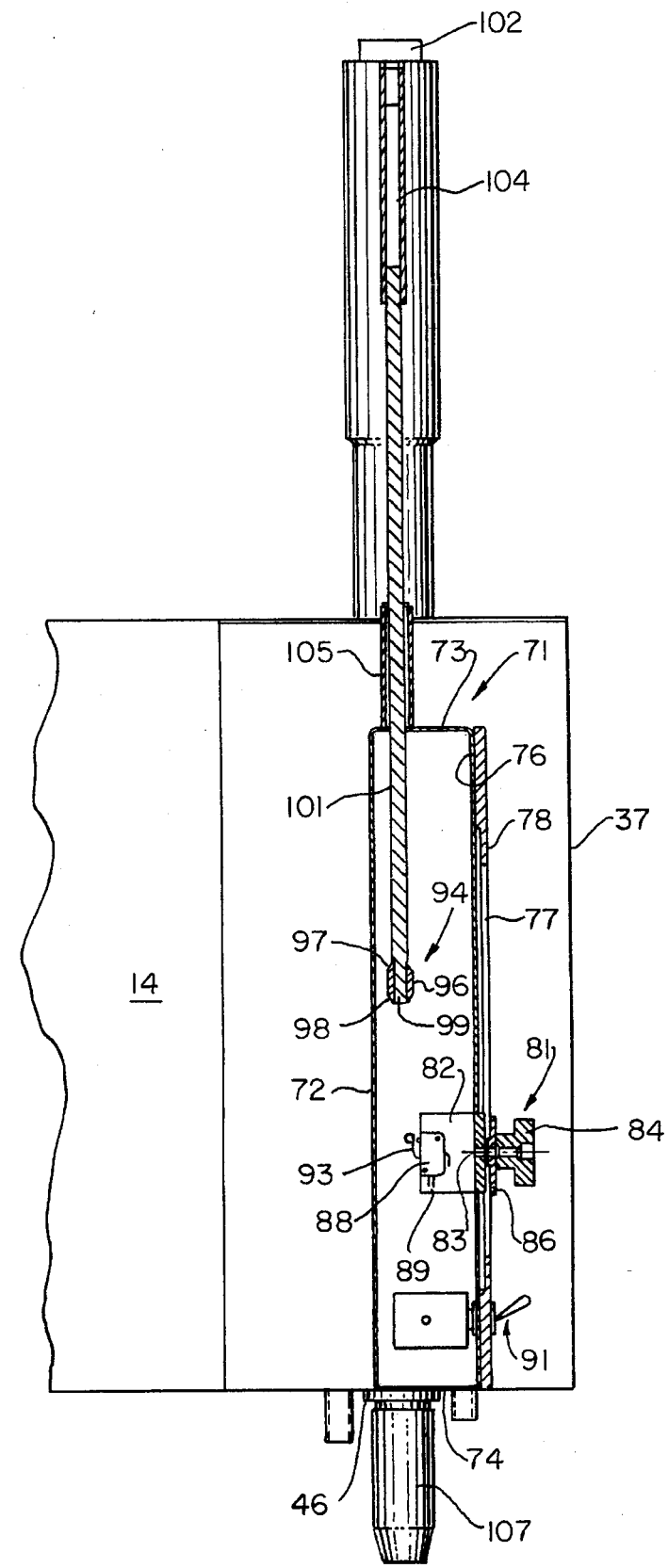
FIG. 8 is a vertical cross-sectional view taken in the plane indicated by the line 8—8 in FIG. 7.

Mounted on the forward end of the cantilever portion 14 of the U-shaped main frame 9 is a housing 37 whose function is to enclose the hydraulic ram or cylinder assembly. The hydraulically driven ram translates precisely along a vertical axis 38. The housing is provided with top and bottom closure plates 39 and 41, respectively. Within the support housing there is detachably mounted on the upper surface of cantilever member 14 a cylinder head member 42, while a similar lower cylinder head member 43 is detachably mounted on the lower surface of cantilever member 14. The upper and lower cylinder head members function to rigidly retain a tubular cylindrical hydraulic cylinder 44 axially aligned with the vertical axis 38. Slidably mounted within the hydraulic cylinder 44 is a vertically translatable hydraulic cylinder or ram 46, the lower end portion 47 of which extends through the lower cylinder head member and is adapted to detachably receive the upper tool holder member 48, shown in cross-section in FIG. 8.

At its upper end (FIGS. 7, 8 and 9), the hydraulic cylinder or ram 46 continues upwardly in an extended portion 49, through a lower stop tube 51 which also functions as a guide tube for the ram. The hydraulic ram extends past the upper end portion 52 of the lower stop tube in an exteriorly threaded portion 53 that extends coaxially through an upper outer tube 54.

Figure 9:
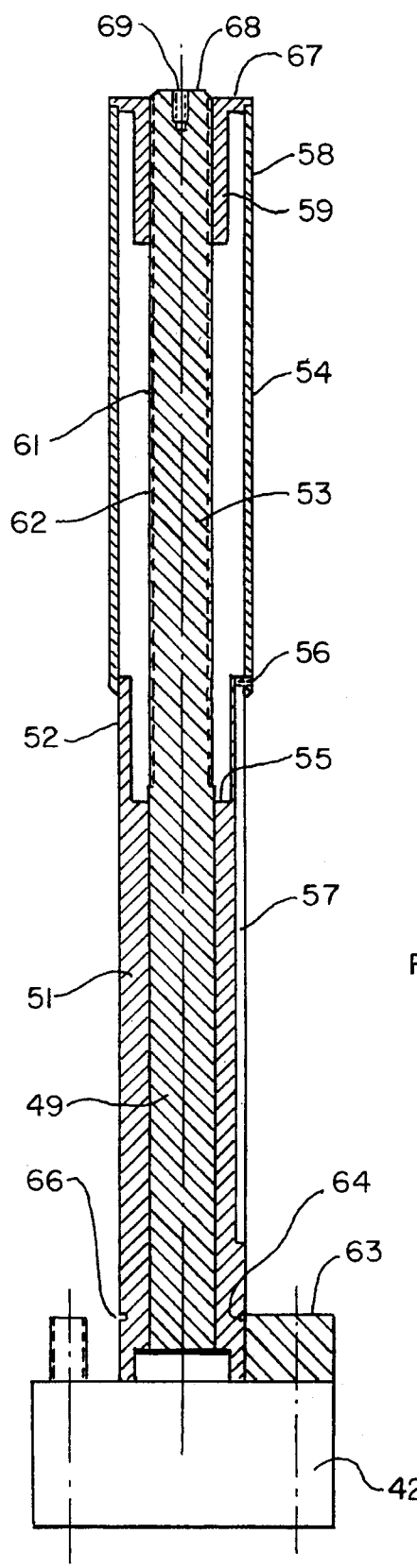
FIG. 9 is a vertical cross-sectional view, partly in elevation, taken in the plane indicated by the line 9—9 in FIG. 7, and illustrating the positive stop-adjustable ram stroke control assembly utilizable to precisely control the bottom stop position of the press ram.

The lower end of the upper outer tube 54 is open and coaxially circumscribes the upper end portion 52 of the lower stop tube 51 as shown in FIG. 9. The inner periphery of the upper end portion 52 of the lower stop tube is increased in diameter to provide an inner annular shoulder 55 which functions as an abutment or stop as will be explained. A guide pin 56 is fixed in the wall of the upper outer tube adjacent its lower end where it overlaps the upper end 52 of the lower stop tube. The guide pin projects radially inwardly into a guide slot 57 formed in the outer periphery and extending longitudinally along the wall of the lower stop tube. While a single guide pin is illustrated, additional guide pins may be used, or appropriate complementary splines may be substituted to provide a slidable relationship between the upper and lower tubes. The upper end portion 58 of the upper outer tube 54 is provided with an integral tubular reentrant stop-nut member 59 having a lower stop surface 60, and interiorly threaded to threadably engage the external threads 61 formed on the outer surface 62 of the upper ram extension portion 53. Preferably, the threads 61 are "fine" threads to augment precise adjustments as explained below.

To enable selective and precise relative axial displacement between the upper/lower stop tube assembly on the one hand and the coaxially associated hydraulic ram extension portions 49 and 53 on the other hand, the lower end of the lower stop tube is rotatably mounted in at least one hold-down block 63 (FIG. 9). A radially inwardly directed flange 64 on the hold-down block rotatably engages a complementary circular slot 66 in the lower end portion of the lower stop tube. The hold-down block is suitably secured to the top cylinder head member 42 by any appropriate means such as machine screws (not shown). It should also be noted that the upper end of the reentrant tubular stop-nut member 59 is provided with an integral radially outwardly extending annular top plate 67 that is welded around its outer periphery to the upper end of the upper outer tube 54. Additionally, the upper end portion of the upper ram extension portion 53 terminates in an exposed flat end surface 68 provided with a coaxially arranged threaded bore 69 for a purpose which will hereinafter appear.

Thus, to precisely adjust the axial relationship of the upper/lower outer tube assembly in relation to the coaxially arranged ram extension portions 49 and 53 so as to positively control the extent of axial translation of the ram, and consequently the spacing between the upper and lower tooling when the ram is fully retracted, all that is require is that the upper/lower outer tube assembly 54/51 be rotated in the hold-down block 63 in relation to the threaded ram extension portion 53 which is restrained from rotation. Such relative rotation results in the coincident rotation of the threaded stop nut 59 on the external threads 61, causing the upper outer tube to translate longitudinally in relation to the ram and the lower outer tube 51 as the guide pin 56 moves along the groove 57. Such longitudinal adjustment of the upper outer tube increases or decreases the spacing between the stop abutment 55 on the lower outer tube and the stop surface 60 on the threaded stop nut 59. Controlling this spacing results in precise upper and lower positioning limits of the lower end of the ram to accommodate various types of upper tooling assemblies, and to position such upper tooling assemblies in proper relation to a workpiece supported on the lower tooling.

Figure 10B:
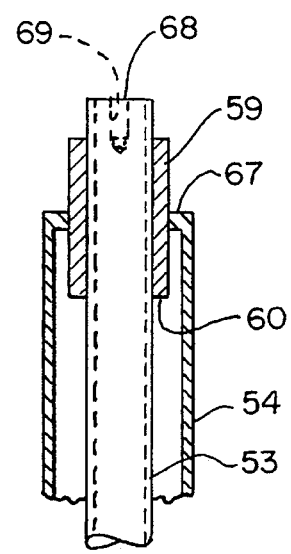
FIG. 10(B) is a view similar to FIG. 10 (A) but illustrating another modification of the structure illustrated in FIG. 9.
Figure 10A:
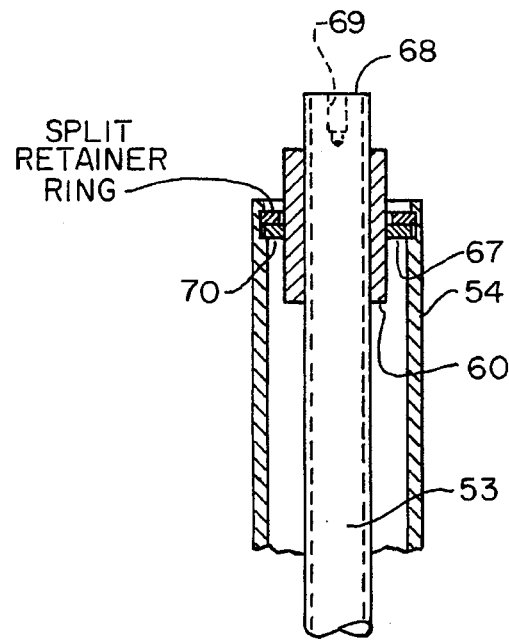
FIG. 10(A) is a fragmentary view partly in elevation and partly in vertical cross-section illustrating a modification of the structure illustrated in FIG. 9.

While the upper outer tube 54 and lower stop tube 51 assembly as described above and illustrated in FIGS. 7, 8 and 9, rotates as a unit in relation to the hold-down block 63, it should be understood that other arrangements are possible. Two such alternative arrangements are shown in FIGS. 10(A) and 10(B). For instance, the upper end portion of the upper outer tube 54 may be welded to an annular end plate 67 which is integral at its inner periphery at about the midpoint of the length of the threaded stop nut 59 as illustrated in FIG. 10(B). The exterior exposed surface of the stop nut may then be grasped by hand, or with an appropriate tool, to rotate the entire assembly, again in relation to the hold-down block and the threaded portion 53 of the ram extension.

Alternatively, to obviate the necessity of rotating the entire upper/lower stop tube assembly in relation to the hold-down block and the threaded ram extension, while still achieving relative axial displacement between the upper stop nut and the lower stop tube and the coaxially arranged threaded upper ram extension 53, the stop nut end plate 67 may be welded at its inner periphery medianly to the stop nut 59 as previously described and illustrated in FIG. 10(B), while the outer periphery of the stop nut end plate 67, is rotatably caught in a circular slot 70 formed in the inner periphery of the upper end of the upper outer tube 54, as shown in FIG. 10(A). With this arrangement, the stop nut 59 may again be rotated either by hand or with a tool, but only the stop nut will rotate in relation to the upper/lower stop tube assembly and the coaxially arranged threaded ram portion 53. Such rotation of only the stop nut, because it is rotatably captured in the circular slot in the upper end portion of the upper outer tube, will result in the stop nut moving axially in relation to the upper threaded ram extension portion 53, causing the upper outer tube to reposition itself axially in relation to the ram and the lower stop tube, and thus selectively precisely set the point of impact of the lower end of the stop nut with the stop shoulder 55 formed in the upper end of the lower stop tube 51. This arrangement precisely sets an easily adjustable lower limit to the lowermost position of the ram and the upper tooling detachably secured thereto to enable completion of a pressing operation, but limit further travel of the ram and upper tooling.

Another advantage of this embodiment is that the lower outer tube 51 may be rigidly yet removably clamped to the cylinder head 42, since neither it nor upper outer tube 54 need rotate. This construction also facilitates disassembly of this portion of the press by mere removal of the split spring retainer ring, and removal of the stop nut by appropriate rotation in relation to the threaded ram portion 53. In both embodiments, the distance between the stop surface 60 and annular plate 67 may be the same as the corresponding surfaces shown in FIG. 9.

To know precisely where to position the upper tooling in relation to the lower tooling to accommodate a specific type or kind of workpiece, and to control and define the predetermined extent of the press "window" to accomplish a press cycle, and provide the means for achieving that purpose, constitutes one of the objects of the operator and tool protection systems of the invention. To accomplish that end, referring to FIGS. 1, 3, 7 and 8, there is illustrated a tool protection control assembly designated generally by the numeral 71, shown detachably secured by appropriate screws to the left side of the hydraulic ram assembly support housing 37. The tool protection assembly includes a housing 72 having an upper end wall 73, a lower end wall 74 that lies substantially flush with the lower end plate of the ram assembly support housing 37, and a front wall 76 having an elongated slot 77 therein extending longitudinally thereallong. Mounted on the front wall is a graduated scale 78 having centimeter graduations 79 along one edge of the slot, and inch graduations 80 along the opposite edge of the slot.

Also mounted on the front wall is a slide member designated generally by the numeral 81, and including an inner body member 82 within the interior of the housing 72 from which projects a threaded stud 83 that extends through the slot and is threadably engaged by a clamp knob 84. Thus, the body member and clamp knob may selectively be position along the length of the slot merely by loosening the knob and sliding the threaded stud up or down as required, and then rotating the clamp knob on the threaded stud to clamp the knob and body member to the front wall at a selected location. To facilitate vertical adjustment of the body member and the clamp knob, a flat slide member 86 in the form of a plate is mounted on the threaded-stud under the clamp knob, and the front wall of the housing in which the slot is formed is recessed to accommodate the flat slide member as it moves along the slot. Mounted on the slide member are oppositely extending pointers 87 that overlap the graduated scales on each side of the slot to enable precise setting of the height of the body member in relation to the longitudinal dimension of the slot by correlation of the pointers with the indicia of the scales that are overlapped by the pointers.

Within the housing, and mounted on the body member therewithin, is an electrically operated microswitch 88 having electrical terminals 89 for connecting the microswitch into an electrical circuit that includes a toggle switch 91 mounted on the front wall of the housing for selectively energizing or disabling, i.e., deenergizing, the tool protection system. Referring again to the microswitch 88, it is provided with a resilient contact arm 93 projecting rearwardly within the housing 72 of the tool protection system in a conventional manner.

Working in cooperation with the microswitch to displace the resilient blade and thus close the circuit (FIGS. 7 and 8), is a microswitch actuator member designated generally by the numeral 94, and comprising a tubular cylindrical sleeve 96 having annular cam surfaces 97 and 98 at opposite ends. The sleeve is secured by one or more set screws (not shown) onto the reduced diameter lower end portion 99 of an elongated rod 101. The end of the rod opposite or remote from the end portion 99 is secured by any suitable means, such as by press-fitting, adjacent the free end of a cantilever beam 102. The opposite end 103 of the cantilever beam is detachably secured or anchored by an appropriate cap screw that passes through appropriate dielectric washers 99' and 99" and a suitable bore in the beam and threadably engages the interiorly threaded bore 69 provided in the flat upper surface 68 of the cylindrical ram extension 53. The elongated rod 101 is thus electrically insulated from the press main frame.

Figure 7A:
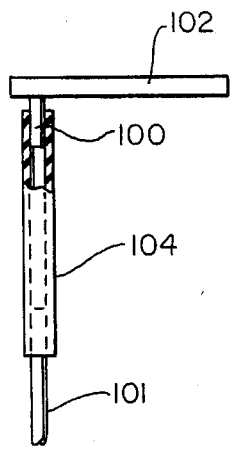
FIG. 7(A) is a fragmentary elevational view, partly in vertical cross-section, illustrating a modification of the connecting means of the switch actuator to the ram.
Figure 7:
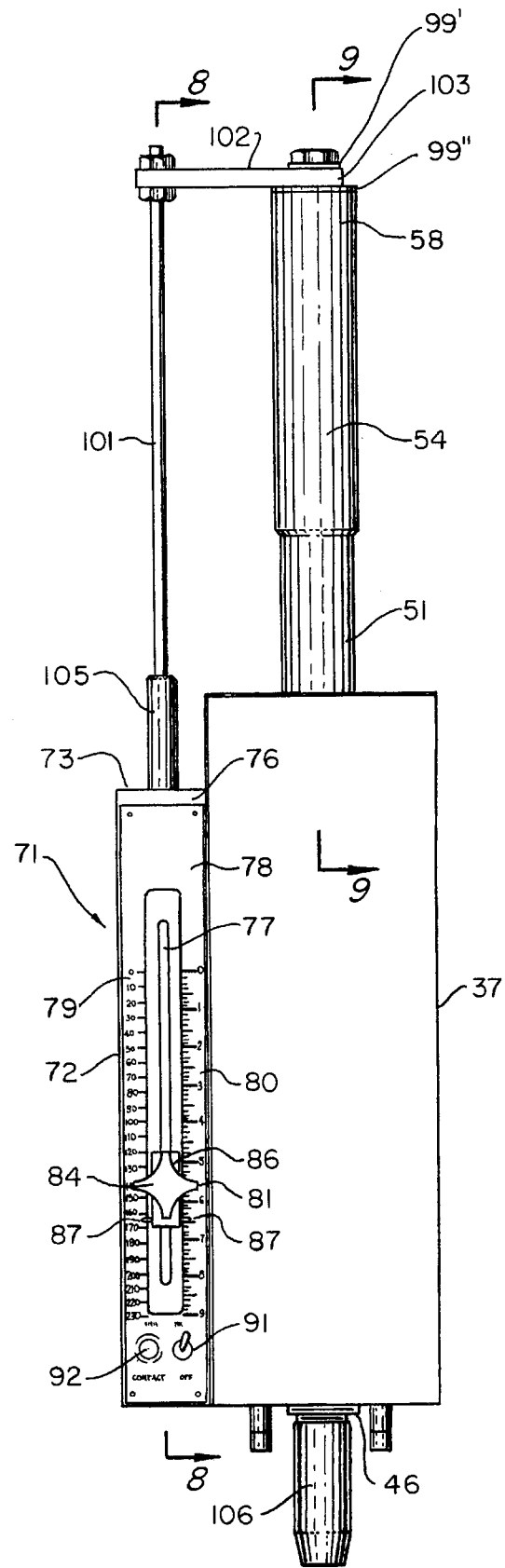
FIG. 7 is a front elevational view of one aspect of the tool protection control system that includes an adjustable limit switch assembly and switch actuator adjustable in relation to one another to sense the position of the ram to define the limits of the press "window" of the press tooling.

In an alternative embodiment shown in FIG. 7(A), the elongated rod 101 may stop short of the beam 102, and the end of the rod 101 may be joined to a dielectric tube 104 the opposite end of which is anchored to a stud 100 projecting from the cantilever beam 102. Such a construction provides the electrical insulation desired between the rod 101 and the press ram and the metal frame on which it is supported.

Intermediate the opposite ends of the elongated rod 101, the rod is slidably supported in a slide bearing extension 105 projecting upwardly from the top surface 73 of the housing 72. It will thus be seen that the longitudinal axis of the elongated rod 101 is parallel with and spaced laterally from the longitudinal axis 38 of the cylindrical press ram 46 and its extensions 49 and 53. Thus, when the press is activated and the press ram moves vertically and axially in relation to the hydraulic cylinder 44 through which it moves when hydraulic fluid is admitted to the cylinder, the elongated rod also moves in unison with the cylindrical ram, moving up or down to the same extent. This characteristic is utilized to set the parameters that define the limits of the press "window" within which operational pressures are developed and applied to a fastener being applied to a workpiece. It should be understood that defining the parameters of the press "window" is important because prior to reaching the upper limit of the press "window", the ram, while moving downwardly, does not move under or exert full operating or pressing pressure. Rather, the ram, being unresisted, is lowered to the upper limit of the press "window" by significantly less pressure, just enough to overcome frictional resistance to movement of the ram in relation to the cylinder through which it travels. Operating pressure is not applied until the tool held in the upper tool holder 107 reaches the upper limit of the press "window" and thereafter encounters resistance, such as impinging against the lower tool or a workpiece supported thereon, which action completes a circuit through an operator safety switch to be described hereinafter so that full operating pressure may build up behind the hydraulic cylinder or ram only when all conditions for applying operating pressure are correct. Thus, while the total excursion of the ram may be controlled by adjustment of the stop nut 59, thus controlling the extent of separation between the upper and lower tooling, the placement of the microswitch 88, determined by placement of the inner slide body 82 through appropriate manipulation of the clamp knob 84, controls the upper and lower limits of the press "zone" or "window".

The procedure for setting up the tool protection system described above involves installation of the tooling on the anvil 13 and on the lower end of the cylindrical ram. If the press is equipped with a modular autofeed system for fasteners, this system is disabled by manipulating the electrical switch that controls it to OFF position. Next, the press selector switches 29 and 31 are manipulated to "Set-up" and "Non-conductive" modes, respectively, and a workpiece is placed on the lower tooling. The ram is lowered by appropriate manipulation of the foot switch 108, and the requisite amount of controlled pressure is applied to perform an operation on the workpiece. The toggle switch 91 is then manipulated to turn ON the tool protection system. Next, the clamp knob 84 is loosened, and the slide body 82 with the microswitch thereon is lowered to the bottom of the slot 77. The microswitch is then elevated incrementally until the indicator light 92 is illuminated. This signifies that the lower cam surface 98 on the microswitch actuator sleeve 96 has depressed the actuator lever 93 of the microswitch to close the switch and thus complete the circuit through the lamp 92. At this point, the operator notes the positions of the pointers 87 in relation to the scales 79 and 80. The switch is then raised precisely by a predetermined amount, say 6 millimeters for instance, using the scale to ensure precise adjustment. This incremental elevation of the microswitch sets the upper limit of the press "window" and insures that sufficient additional travel of the ram will occur to complete the press operation. The microswitch is then locked in place by tightening the clamp knob 84.

By this method, it will be seen that as the press cylinder or ram reciprocates between a retracted position and a "press" position, the elongated rod 101 will also reciprocate in the same directions and to the same extent as the press cylinder. Thus, on the down stroke of the press cylinder, the lower cam surface 98 on the microswitch actuator 94 will depress the switch arm 93 and thereby indicate to the operator by illumination of the lamp 92 that the press cylinder with attached tooling has reached the uppermost limit of the press "window". Simultaneously, the 6VDC circuit that senses the electrical contact between the upper and lower tooling, interrupted up to this point, will be re-established, thus enabling continued downward travel of the ram.

Prior to the tooling achieving this position, the press is prevented from exerting full operating pressure until the sensing circuit is re-established, which occurs when the cam sleeve 94 has reached the upper limit of the press "window" and caused the microswitch blade 93 to be depressed by placement of the lower cam surface 98 opposite the switch lever, thus re-establishing the sensing circuit that senses electrical contact between the tooling and enabling the press to apply full operating pressure on the tooling. It should be noted that the concept of providing electrical contact between the upper and lower tooling is clearly described and illustrated in U.S. Pat. No. 4,391,358 owned by the owner of the instant invention. The tool protection system described and illustrated herein improves on that previous patent and extends its utility to the protection of the tooling in addition to the protection of the operator through a more comprehensive design.

Figure 11:
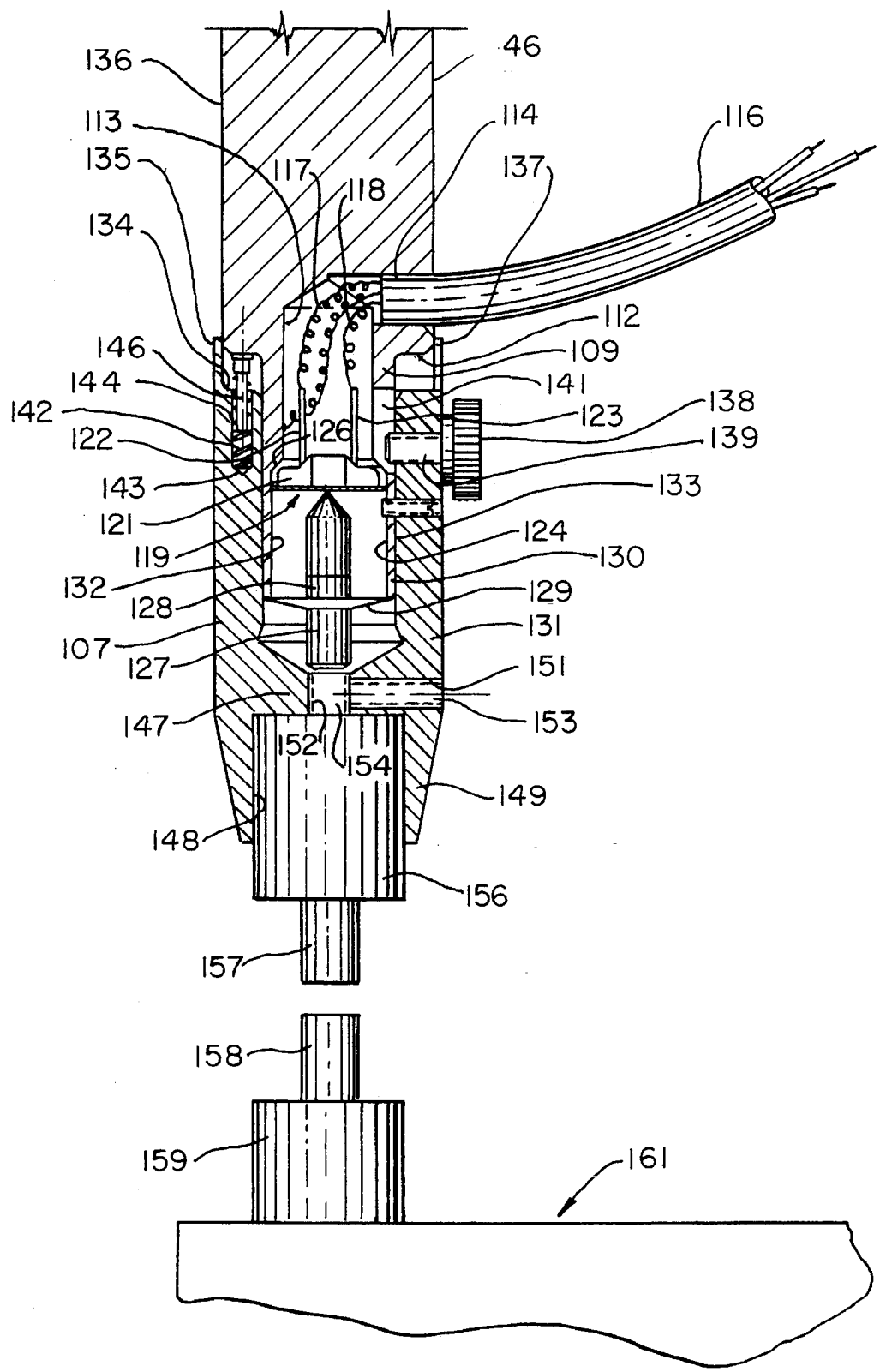
FIG. 11 is a fragmentary vertical cross-sectional view of the upper tool holder assembly illustrating details of the operator safety controls incorporated into the press ram assembly.
Figure 12:
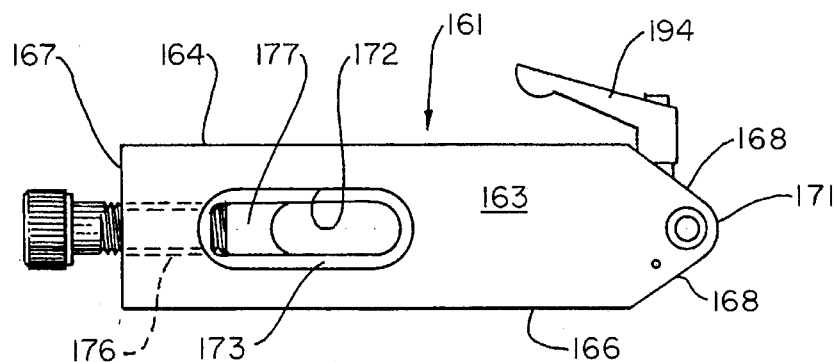
FIG. 12 is a top plan view of the lower tool holder shown apart from other structure.

In the interest of completeness of this disclosure to enable one skilled in the art to practice the invention, reference is made to FIG. 11, where the interrelationship of the upper tool holder 107 with the lower end of the hydraulic ram 46 is illustrated. As there shown, the lower end portion 109 of ram 46 is reduced in outside diameter to provide a downwardly facing annular shoulder 112. Interiorly, the reduced diameter ram portion 109 is provided with a first concentric bore 113 that extends into the ram portion 46. A transverse radially extending bore 114 is provided in the ram portion 46 and at its inner end communicates with the bore 113. The transverse bore 114 serves to mount a three wire electric cord 116, the leads 117 and 118 of which are electrically connected to a safety switch assembly designated generally by the numeral 119, while the third wire is used to make an electrical connection to the cylinder ram adjacent to the safety switch. This connection is independent of either leads 117 and 118.

This separation of the third wire tooling contact lead from the safety switch wiring enables the operator to turn it on and off with the adjustable limit switch and therefore produce the desired press "window." Stated in other words, the tooling contact must be made before the press is permitted to complete a stroke. The addition of the adjustable limit switch to the control system serves to interrupt the tooling contact except when the upper tool is within the press "window." Thus, the safety switch for operator protection is always active. The system thus allows the operator to select the specific range that the press is permitted to exert pressure.

The switch assembly 119 includes a non-conductive plastic body 121 from which project two embedded spade terminals 122 and 123 connected, respectively, to leads 117 and 118 as shown. The body 121 of the switch assembly is inserted into the lower and second concentric bore 124 that is formed in the end portion of ram 46. The second bore 124 is larger in diameter than first bore 113, to form a shoulder 126 at the transition point between the two coaxial bores. The switch body 121 is pressed into the bore 124 until it comes to rest against shoulder 126, where it is detachably secured by an appropriate set screw as shown.

Below the switch body 121, there extends an electrically non-conductive member 127 having an upper end portion 128 captured in a recess formed in the plastic switch body 121 as shown. The member 127 is coaxially mounted on a conductive circular plate 129 the outer peripheral margin of which electrically conductively abuts the annular end surface 130 of the ram.

The upper tool holder 107, as seen in FIG. 11, is coaxially mounted on the reduced-in-diameter ram portion 109 for snug axial sliding movement thereon. The upper tool holder 107 includes an upper cylindrical skirt portion 131 the inner periphery 132 of which slidably engages the outer periphery 133 of the ram portion 109. At its upper open end, the annular skirt portion 131 is counter-bored to produce a shoulder 134 and a cylindrical flange 135. As shown, the inner periphery of the flange 135 slidably engages the outer periphery 136 of the ram 46, and is provided with a slot 137 adapted to accommodate the three-wire electrical cord 116 when the upper tool holder is axially displaced to its upper position, as will hereinafter be explained.

The upper tool holder is detachably secured to the ram for slidable movement in relation thereto by a thumb screw 138 the shank 139 of which projects into a vertical slot 141 formed in the ram portion 109. In its lowermost position, as shown in FIG. 11, the end portion of flange 135 overlaps the ram 46 below the transverse bore 114. Also, the shoulder 134 on the skirt 131 is spaced below the shoulder 112 on the ram 46. This relationship is resiliently maintained by a plurality of compression spring assemblies designated generally by the numeral 142. These assemblies, preferably four in number equally spaced circumferentially about the shoulder 134 on the skirt 131, each includes an axially extending bore 143 formed in shoulder 134, a compression spring 144 seated in the bore 143, and a guide and electrical continuity pin 146 disposed between each spring and the shoulder 112 so that the upper tool holder is normally resiliently biased downwardly away from the ram 46 to the limit determined by shank 139 of the thumb screw 138 abutting the lower end of slot 141.

At its opposite or lower end, the tool holder 107 is provided with a transverse wall 147 that separates the cylindrical cavity formed by the inner periphery of the first cylindrical bore 132 and the cylindrical inner periphery of a second bore 148 formed in the lower tapered end portion 149 of the upper tool holder. Also formed in the lower portion of the upper tool holder, specifically in the transverse wall 147, is a radially extending threaded bore 151 that at its inner end communicates with the interior of the axially extending central bore 152 formed in the transverse wall 147. A set screw 153 is threadably engaged in bore 151, and a set screw 154 is threadably engaged in threaded bore 152. Set screw 154 is adjustable to set the exact position to achieve contact opening of the safety switch after the upper tool holder has traveled a predetermined distance, say 0.025–0.030", relative the cylinder ram. After this setting is made, the set screw 154 is locked in its set position by adjustment of set screw 153, the inner end of which is caused to abut the set screw 154. Bore 148 is utilized to detachably receive the base portion 156 of a tool 157 adapted to cooperate with a lower tool 158 having a base 159 secured in a lower tool holder designated generally by the numeral 161. The base portion 156 of the upper tool is locked to the upper tool holder by one or more appropriate set screws (not shown).

From the foregoing, it will be seen that as the hydraulic ram 46 moves downwardly, the upper tool holder 107 is carried down with it until the upper tool encounters a workpiece supported on the lower tool 158, or until the upper tool 157 encounters the lower tool 158, as during the set-up procedure discussed above. At the instant the upper tool contacts the workpiece or the lower tool, the upper tool holder ceases momentarily to move downwardly, while the hydraulic ram 46 continues its downward movement, thus causing the ram 46 to move deeper into the flange 135, simultaneously compressing the springs 142 in the bores 143, accommodating the electrical lead 116 in the slot 137, and continuing the relative movement between the ram and the upper tool holder until the shoulder 112 on the ram comes into contact with the shoulder 134 on the upper tool holder skirt 131. However, before this shoulder-to-shoulder contact occurs, it is important to note that as soon as the upper tool makes physical contact with the workpiece or the lower tool, and is thus stopped momentarily in its downward movement, the non-conductive member 127, because it is mounted on the ram and continues its downward movement therewith, is caused to physically abut the upper end of the set screw 154. Now, pressure exerted on the lower end of the non-conductive member 127 is transferred to the normally closed switch assembly 121, causing this switch to open, thus completing an electrical circuit between the upper and lower tools, and consequently providing assurance that the operators finger or hand, which is not conductive, is not interposed between the upper and lower tools. Simultaneously, opening the switch 121 transfers to the microswitch 88 and its actuator 94 the function of defining the press "window" and activating the press to impose operative pressure on the ram so as to accomplish a pressing function.

It should also be understood that because of the precise adjustment of the lower limit of travel of the press cylinder through adjustment of the stop nut 59 in relation to the press cylinder and the stop shoulder 55, an absolute lower limit is provided beyond which the press cylinder cannot advance. This ensures that the tooling, which is set to travel only within the limits required for a specific press operation, will not advance to the point where the tooling itself is destroyed. It should also be noted that when it is desired to dispense with operation of the tool protection system, all that is required is that the toggle switch 91 be actuated, which results in the press operating in the usual manner where metal-to-metal electrically conductive contact between the tooling at any point along its path will result in the press cylinder exerting full operational pressure if it encounters resistance to its advance.

To secure full advantage from the tool protection system described and illustrated herein, there is provided a lower tool holder assembly that ensures that the lower tool, detachably supported in the lower tool holder, will be precisely aligned axially with the upper tool when that relationship is required, which appears to be the rule. However, there are circumstances during the use of a press such as the one illustrated when it is necessary that the lower tool be purposely positioned out of axial alignment with the upper tool. This may occur because of the peculiarity of a particular fastener, or the configuration of a particular workpiece, or for any of several other reasons that make it advantageous to have the facility of positioning the lower tooling in purposeful misalignment with the upper tooling.

To accomplish this purpose, and referring to FIGS. 3 and 12–14, the upper surface 18 of the lower anvil 13 of the main frame is provided with bores 19 and 21 as previously discussed. These bores are located in a common vertical plane that includes the central axis of the hydraulic cylinder. The bore 19, adjacent the front end face 17 of the anvil, has a smooth interior surface, while the bore 21 is provided with internal threads. Detachably mounted on the surface 18 of the anvil is a lower tool holder assembly designated generally by the numeral 161, being formed from high quality steel to provide a monolithic and very rigid tool holder having a generally rectangular configuration and on which the lower tooling for the press may be detachably mounted.

Figure 13:
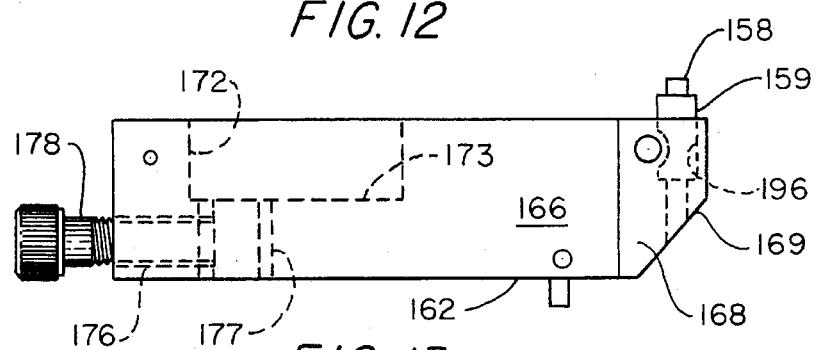
FIG. 13 is left side elevational view of the lower tool holder illustrated in FIG. 12.
Figure 14:
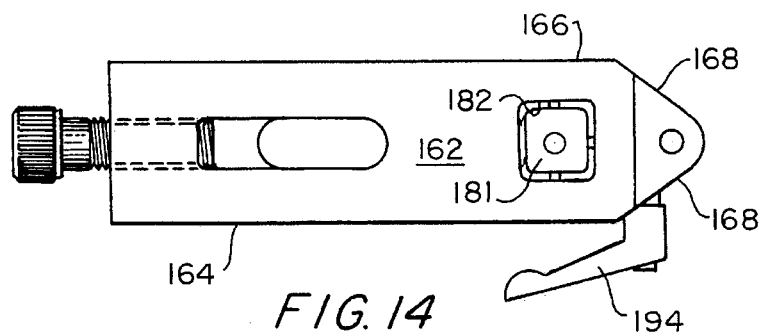
FIG. 14 is a bottom plan view of the lower tool holder.

The lower tool holder 161 is provided with a smooth flat lower surface 162, a top surface 163, side surfaces 164 and 166 that intercept the top and bottom surfaces, a rear surface 167 perpendicular to the top, bottom and side surfaces, and front end surfaces 168 and 169, the former being generally wedge-shaped, diverging laterally from a smoothly rounded apex 171 to intercept the side surfaces 164 and 166 in a lateral direction, and to intercept the top surface as shown in FIG. 13. An elongated slot 172 extends between the top and bottom surfaces, and is medianly positioned between the two side surfaces, but closer to the rear surface than to the front surface. From the top surface of the holder, the slot is enlarged both laterally and longitudinally to provide a recessed shoulder 173 adapted to receive a flat washer 174 and a cap screw 22 (FIG. 3) to detachably secure the holder to the top surface 18 of the anvil.

From the rear surface 167, there is provided a threaded bore 176 that intercepts the interior of the slot 172. Resting in the slot and supported by the surface 18 of the anvil, is an abutment member 177 the rear end of which is abutted by threaded spindle 178 to drive the abutment member toward the front end of the holder when the spindle is appropriately rotated. The front end of the abutment member is semi-cylindrical and provided with partial threads that engage the threads of the cap screw 22 when the abutment member is pressed forwardly by rotation of the spindle so that it moves in the direction of the slot. Thus, with the cap screw 22 tightened securely to press the body of the tool holder tightly against the upper surface 18 of the anvil, and with the spindle rotated to tighten the abutment member against the threaded portion of the cap screw 22, it will be seen that the lower tool holder is securely yet releasably fastened to the anvil.

Figure 15:
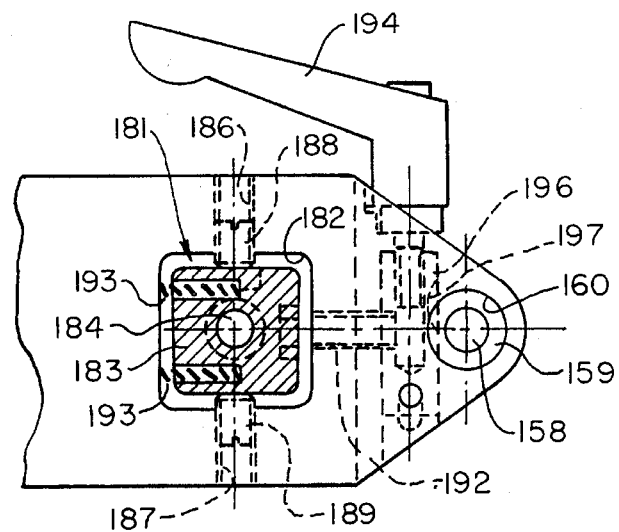
FIG. 15 is a fragmentary sectional view illustrating the lower tool adjustment means for effecting lateral and longitudinal adjustment of the lower tool holder.

Referring to FIG. 15, to enable purposeful and intentional misaligned positioning of the lower tool in relation to the upper tool, the forward end of the lower tool holder body is held in place by an adjustment assembly designated generally by the numeral 181 that lies spaced within a generally square recess 182 extending through the lower surface of the tool holder, but which does not pass entirely through the tool holder. Within the square recess there is provided a square steel block 183 dimensioned so that the sides of the block are spaced from the sides of the bore by about ⅛". Fixed in the center of the lower surface of the block is a steel locating pin 184 that extends below the lower surface of both the block and the lower surface of the tool holder body to engage the smooth bore 19 in a snug slip fit.

From opposite side surfaces of the tool holder body, axially aligned threaded bores 186 and 187 communicate with the square bore, and set screws 188 and 189 having semi-spherical inner ends, impinge on complementary recesses formed in the associated sides of the square block 183. Thus, by adjusting the positions of the set screws 188 and 189, the forward end of the tool holder body may be adjusted laterally within the limits defined by the space between the square steel block 183 and the inner associated surfaces of the square recess 182. This lateral adjustability of the forward end of the lower tool holder enables a lower tool 158 supported thereon in the tool nacelle 160 to be purposely misaligned with respect to the vertical axis 38 of the upper tool.

Fore and aft adjustment of the lower tool holder body is achieved by adjusting the position of the set screw 192 that threadably penetrates the tool holder body from the lower front face thereof and is rotatably connected to the associated front side of the square block as shown. When the set screw is rotated clockwise, the square block, being immovable because of the locating pin 184, causes the lower tool holder to be pulled forward, compressing the coil compression springs 193 that function to resiliently accommodate adjustment of the lower tool holder in relation to the square block. It will of course be understood that while these adjustments are being made, the cap screw 22 is loosened to permit lateral or fore and aft displacement of the lower tool holder body to its selected position, and it is then re-tightened.

To retain the lower tool base portion 159 in its cylindrical nacelle 160 formed in the forward end portion of the lower tool holder 161, a rotatable handle 194 is provided with a laterally extending cylindrical bushing 196 having a semi-cylindrical notch 197 therein that may selectively be brought into registry with a complementary semi-cylindrical notch in the surface of the lower tool base 159 to thus permit removal of the lower tool and its base from the lower tool holder. To lock the lower tool to the lower tool holder body, the handle is rotated to bring a cylindrical portion of the bushing 196 into engagement with the semi-cylindrical notch in the lower tool base, thus detachably locking the lower tool to the lower tool holder body.

While it is important to protect the tooling in a press of the type described and illustrated herein, it is also important to protect the operator of the press against inadvertent injury. Thus, some presses do not incorporate safety systems that prevent cycling of the press if the operator's hand or fingers are inserted between the associated ends of the upper and lower tooling. A structure embodying this principle is disclosed in U.S. Pat. No. 4,391,358, assigned to the owner of the instant invention, wherein the press will not cycle to apply injurious pressure on the tooling if a non-conductive member, such as a non-conductive hand or a finger, intervenes between the upper and lower tooling. This result is accomplished in the patent noted by requiring that an electrical circuit be completed between the upper and lower tooling before operational pressure can be applied to the tooling. The same principle, but different structure, is embodied in the present invention.

Thus, to summarize the relationship between the tool protection aspects and the operator protection aspects of the present invention, the tool protection aspect prevents the press from cycling except when the ram advances the upper tool to a predetermined position that defines a press "window". If the pressure on the ram builds up to a predetermined amount, say ten pounds, either before or after the pre-defined range of movement of the press tool defined by the "window", the press ram will stop and return to its retracted position. Stated in other words, tooling operative pressure of the press ram can only be exerted within the press "window" that is set by the adjustable limit switch 88 working in conjunction with the switch actuator 94. Within this "window" range, the 6VDC circuit that senses the electrical contact between the upper and lower tooling is interrupted to thus enable operative pressure to be applied to the ram so long as it is within the limits defined by the press "window".

If it is desired to deactivate the tool protection aspect of the invention, all that is required is that the toggle switch 91 be actuated to its OFF position. In that event, with the tool protection system deactivated, the press operates in a manner that tooling contact can be made at any point in the travel of the ram. It should of course be understood that in this mode of operation the operator safety switch 119 is operative to effect retraction of the ram if the ram encounters any electrically non-conductive member and imposes a predetermined level of pressure sufficient to actuate the safety switch 119. It should be understood however, that the press of the present invention may be switched to a "non-conductive" mode by actuation of the mode selector switch 31 so that non-conductive workpieces may be associated with the press. In this mode, when the ram comes into contact with the non-conductive workpiece, it stops, and the operator must then press the foot switch 108 a second time to cause the ram to continue its downward movement.

In summary, three distinct modes of operation of then press are selectively available as follows:

Mode 1: Conductive Mode—Tool Protection System inactive.

The operator depresses the footswitch and maintains pressure. The ram descends and makes contact with the conductive workpiece. Tooling contact is made and relay R2 is energized. Contacts R2A close. The safety switch opens as member 127 impinges on set screw 154. Relay R1 becomes de-energized and contacts R1A open. The ram continues down because contacts R2A bypass contacts R1A. Downward travel continues until the hydraulic pressure rises to the preset level. The pressure switch closes and reverses the cycle.

It should be noted that in Mode 1, if the safety switch opens as member 127 impinges on set screw 154 and tooling contact has not been made, continuity to the valve is lost and the press cycle is reversed through a signal provided to the timer T4 at the Push Up Trigger.

Mode 2: Non-Conductive Mode—Tool Protection system inactive.

The operator depresses the footswitch and maintains pressure. The ram descends and makes contact with the non-conductive workpiece. The safety switch opens as member 127 impinges on set screw 154. The ram stops immediately. The operator removes foot from the footswitch. Relay R7 is energized. The operator depresses the footswitch a second time and maintains pressure. The press starts downward. The travel of the ram continues until the hydraulic pressure rises to the preset value. The pressure switch closes and reverses the cycle.

Mode 3: Conductive Mode—Tool Protection System active.

The operator depresses the footswitch and maintains pressure. The ram descends and enters the "press window". The adjustable limit switch closes and completes the path to the tooling contact. The ram makes contact with the conductive workpiece. Tooling contact is made and relay R2 is energized. Contacts R2A close. The safety switch opens as member 127 impinges on set screw 154. Relay R1 becomes de-energized and contact R1A opens. The press continues downward because contacts R2A bypass contacts R1A. Downward travel continues until the pressure rises to the preset value. The pressure switch closes and reverses the cycle.

It should be noted that if the press fails to make tooling contact, or fails to be inside the press "window" when the safety switch is actuated, the press will reverse the cycle without exerting any pressure on the workpiece.

Having thus described the invention, what is believed to be new and novel and sought to be protected by letters patent of the United States is as defined in the appended claims.

I claim:

1. A hardware insertion press for assembling fastening devices or punching holes in sheetmetal hardware devices and incorporating operator and/or tool protection safety systems, comprising:

a. a base unit;

b. a main frame mounted on said base unit and including a lower tool-support anvil member and a hydraulic ram/upper tool assembly support member;

c. a pressure-exerting ram assembly mounted on said hydraulic ram/upper tool assembly support member and including a hydraulic cylinder and a double-acting ram operatively associated and selectively movable through a predetermined excursion along its longitudinal axis, said lower tool-support anvil member underlying said ram assembly;

d. an upper tool holder slidably mounted on said ram in electrically conductive interrelation therewith and adapted to removably support a selected upper tool thereon;

e. a lower tool holder assembly mounted on said anvil member and adapted to removably support a selected lower tool thereon in cooperative relation to said upper tool;

f. first control means for normally selectively advancing said ram to bring said upper and lower tools together into a predetermined pressure exerting relationship upon a workpiece interposed there between while automatically stopping advance of the ram if the operator's hand intervenes between the upper and lower tools;

g. said first control means including a normally closed safety switch operatively interposed between said ram and said upper tool holder and operable to normally open a circuit to stop the advance of the ram when a non-conductive element, such as the operator's hand, is encountered with sufficient force to slidably displace said upper tool holder to open said normally closed switch; and h. second control means operatively associated with said ram and responsive to axial displacement thereof to define the limits of a press "window" only within the limits of which "window" will a selected operating pressure normally be applied to a workpiece interposed between said upper and lower tools;

wherein said hydraulic ram is symmetrical about a longitudinal axis perpendicular to said upper and lower tool support members and includes an exteriorly threaded upper end portion that projects above said upper tool-support member, and said second control means operatively associated with said ram includes a lower stop tube rotatably mounted on said upper tool-support member and coaxially arranged about a portion of the ram projecting above the tool-support member, said lower stop tube having an abutment thereon adjacent one end thereof and an elongated guide slot on its outer periphery, an upper outer tube coaxially arranged about said exteriorly threaded upper end portion of the ram and including a threaded stop nut threadably engaging said exteriorly threaded ram portion and a guide pin slidably engaging the guide slot in said lower stop tube, a cantilever beam mounted on the upper end surface of the ram and extending laterally therefrom generally perpendicular to the longitudinal axis of the ram to provide a free end laterally spaced from the ram, and a tool protection assembly mounted on the upper tool-support member and including an actuator shaft mounted by its upper end on said cantilever beam and depending in general parallelism with said ram to a lower end, a microswitch selectively vertically adjustably supported on said upper tool support member in operative association with said lower end of said actuator shaft, and means on the lower end of said actuator shaft adapted to actuate said microswitch when said ram and said actuator shaft move axially during a press operation whereby at least the upper limit of said press "window" is determined by the position of said microswitch in relation to said ram and actuator shaft.

2. The hardware insertion press according to claim 1, wherein said tool protection assembly includes a housing mounted on said upper tool support member, said actuator shaft extends into said housing, said microswitch is enclosed within said housing and is selectively vertically slidably adjustable there within in relation to said ram and actuator shaft, a graduated scale on said housing indicating selected units of length, and pointer means movable with said microswitch and overlying said scale to indicate the extent of selected slidable adjustment of said microswitch.

3. The hardware insertion press according to claim 2, wherein an electric toggle switch is mounted on said housing selectively actuable to energize or de-energize said tool protection system.

4. The hardware insertion press according to claim 1, wherein said cantilever beam is electrically insulated from said ram.

5. The hardware insertion press according to claim 1, wherein said free end of said cantilever beam is provided with a stub shaft axially aligned with said actuator shaft, and dielectric connector means joins said stub shaft to the associated end of said actuator shaft.

6. The hardware insertion press according to claim 5, wherein said dielectric connector means comprises a laterally flexible tube.

7. The hardware insertion press according to claim 1, wherein said means on the lower end of said actuator shaft adapted to actuate said microswitch comprises a cylindrical sleeve having truncated conical cam surfaces on opposite ends adapted to interact with the microswitch to define the upper a lower limits of the press "window."

8. A hardware insertion press for assembling fastening devices or punching holes in sheetmetal hardware devices and incorporating operator and/or tool protection safety systems, comprising:

a. a base unit;

b. a main frame mounted on said base unit and including a lower tool-support anvil member and a hydraulic ram/upper tool assembly support member;

c. a pressure-exerting ram assembly mounted on said hydraulic ram/upper tool assembly support member and including a hydraulic cylinder and a double-acting ram operatively associated and selectively movable through a predetermined excursion along its longitudinal axis, said lower tool-support anvil member underlying said ram assembly;

d. an upper tool holder slidably mounted on said ram in electrically conductive interrelation therewith and adapted to removably support a selected upper tool thereon;

e. a lower tool holder assembly mounted on said anvil member and adapted to removably support a selected lower tool thereon in cooperative relation to said upper tool;

f. first control means for normally selectively advancing said ram to bring said upper and lower tools together into a predetermined pressure exerting relationship upon a workpiece interposed there between while automatically stopping advance of the ram if the operator's hand intervenes between the upper and lower tools;

g. said first control means including a normally closed safety switch operatively interposed between said ram and said upper tool holder and operable to normally open a circuit to stop the advance of the ram when a non-conductive element, such as the operator's hand, is encountered with sufficient force to slidably displace said upper tool holder to open said normally closed switch; and h. second control means operatively associated with said ram and responsive to axial displacement thereof to define the limits of a press "window" only within the limits of which "window" will a selected operating pressure normally be applied to a workpiece interposed between said upper and lower tools;

wherein said lower tool holder assembly comprises a monolithic lower tool holder body having a lower surface adapted to impinge on said anvil member, means on said lower tool holder body for detachably securing a lower tool, means on said lower tool holder body for adjusting the axis of said lower tool in relation to the axis of said upper tool, and means for detachably clamping said lower tool holder body to said anvil member in its adjusted position; and wherein said means for adjusting the axis of said lower tool comprises a recess formed in the lower surface of the lower tool holder body, a locating pin embedded in the tool holder body in said recess, a block within the recess mounted on said locating pin, said block having side surfaces spaced from the sides of said recess, means interposed between said block and a recess wall biasing said lower tool holder body in relation to said block, means adjustably mounted on said lower tool holder body selectively manipulable to laterally shift the lower tool holder body in relation to said block and said locator pin, and means adjustably mounted on said lower tool holder body selectively manipulable to longitudinally shift the lower tool holder body in relation to said block and said locator pin, whereby the axis of said lower tool may be selectively aligned or misaligned with the axis of the upper tool.

9. A hardware insertion press for assembling fastening devices or punching holes in sheetmetal hardware devices and incorporating operator and/or tool protection safety systems, comprising:

a. a base unit;
 b. a main frame mounted on said base unit and including a lower tool-support anvil member and a hydraulic ram/upper tool assembly support member;
 c. a pressure-exerting ram assembly mounted on said hydraulic ram/upper tool assembly support member and including a hydraulic cylinder and a double-acting ram operatively associated and selectively movable through a predetermined excursion along its longitudinal axis, said lower tool-support anvil member underlying said ram assembly;
 d. an upper tool holder slidably mounted on said ram in electrically conductive interrelation therewith and adapted to removably support a selected upper tool thereon;
 e. a lower tool holder assembly mounted on said anvil member and adapted to removably support a selected lower tool thereon in cooperative relation to said upper tool;
 f. first control means for normally selectively advancing said ram to bring said upper and lower tools together into a predetermined pressure exerting relationship upon a workpiece interposed there between while automatically stopping advance of the ram if a non-conductive element, such as the operator's hand, intervenes between the upper and lower tools;
 g. said first control means including a normally closed safety switch operatively interposed between said ram and said upper tool holder and operable to normally open a circuit to stop the advance of the ram when a non-conductive element, such as the operator's hand, is encountered with sufficient force to slidably displace said upper tool holder to open said normally closed switch; and
 h. second control means operatively associated with said ram and responsive to axial displacement thereof to define the limits of a press "window" only within the limits of which "window" will a selected operating pressure normally be applied to a workpiece interposed between said upper and lower tools, said second control means comprising:

a. an upper end portion on said hydraulic ram that projects above said upper tool support member;
 b. a cantilever beam mounted on the upper end surface of the ram and extending laterally therefrom generally perpendicular to the longitudinal axis of the ram to provide a free end laterally spaced from the ram;
 c. a tool protection assembly mounted on the upper tool support member and including an actuator shaft mounted by its upper end on said cantilever beam and depending in general parallelism with said ram to a lower end;
 d. a microswitch selectively vertically adjustably supported on said upper tool support member in operative association with said lower end of said actuator shaft; and
 e. means on the lower end of said actuator shaft adapted to actuate said microswitch when said ram and said actuator shaft move axially during a press operation whereby at least the upper limit of said press "window" is determined by the position of said microswitch in relation to said ram and actuator shaft.

10. The hardware insertion press according to claim 8, wherein said cantilever beam is electrically insulated from said ram.

11. The hardware insertion press according to claim 8, wherein said free end of said cantilever beam is provided with a stub shaft axially aligned with said actuator shaft, and dielectric connector means joins said stub shaft to the associated end of said actuator shaft.

12. The hardware insertion press according to claim 8, wherein an electric toggle switch is mounted on said housing selectively actuable to energize or de-energize said tool protection system.

13. The hardware insertion press according to claim 8, wherein said dielectric connector means comprises a laterally flexible tube.

14. The hardware insertion press according to claim 8, wherein said means on the lower end of said actuator shaft adapted to actuate said microswitch comprises a cylindrical sleeve having truncated conical cam surfaces on opposite ends adapted to interact with the microswitch to define the upper and lower limits of the press "window."

* * * * *